Inventor
Buddy H. Layman
By John P. Hines
Attorney

United States Patent Office 3,368,091
Patented Feb. 6, 1968

3,368,091
ROTATING RECTIFIER
Buddy H. Layman, Hammersville, Ohio, assignor to Allis-Chalmers Manufacturing Company, Milwaukee, Wis.
Filed May 24, 1965, Ser. No. 457,986
2 Claims. (Cl. 310—68)

This invention pertains to the construction and method of assembling a rectifier and more particularly to the construction and method of assembling a rotating rectifier for electric machines.

Electrical machines such as generators require an exciting current for the armature coils. This exciting current is in many instances provided by a small generator called an exciter placed on the generator shaft. However, the current produced by the exciter is alternating and it is necessary to provide a direct current as the exciting current for the armature coils. This may be accomplished by providing a rectifier which receives the alternating current from the exciter, rectifies it to direct current and delivers the direct current to the generator rotating field.

My invention pertains to the rotating type of rectifier which is attached to the generator shaft and rotates with the generator and exciter armatures. In the past it has been the practice to provide two axially spaced disks on the shaft. The disks, one a cathode and the other an anode are usually shrunk onto the generator shaft after the generator and exciter armatures are dipped in varnish and baked. With my invention the cathode and anode parts of the rectifier are placed on the generator shaft in the same plane to thereby reduce the overall length of the machine. Furthermore, the rectifier is attached to the generator shaft before the varnish is applied so that the rectifier is also dipped and baked with the remaining portions of the generator. It is therefore my intention and the general object of this invention to provide a rotating rectifier of a less expensive and less complicated design.

A further object of the subject invention is to provide a rotating rectifier composed of two half sections attached to the generator shaft in the same plane and insulated from one another.

A further object of the subject invention is to provide a rotating rectifier of the hereinbefore described type which is attached to the generator shaft by means of polyester glass band tape and heat shrinkable tape and thereafter coated with a varnish to provide an integrated rotating assembly.

An additional object of the subject invention is the novel method of assembling a rotating rectifier of the hereinbefore described type.

Figure 1:
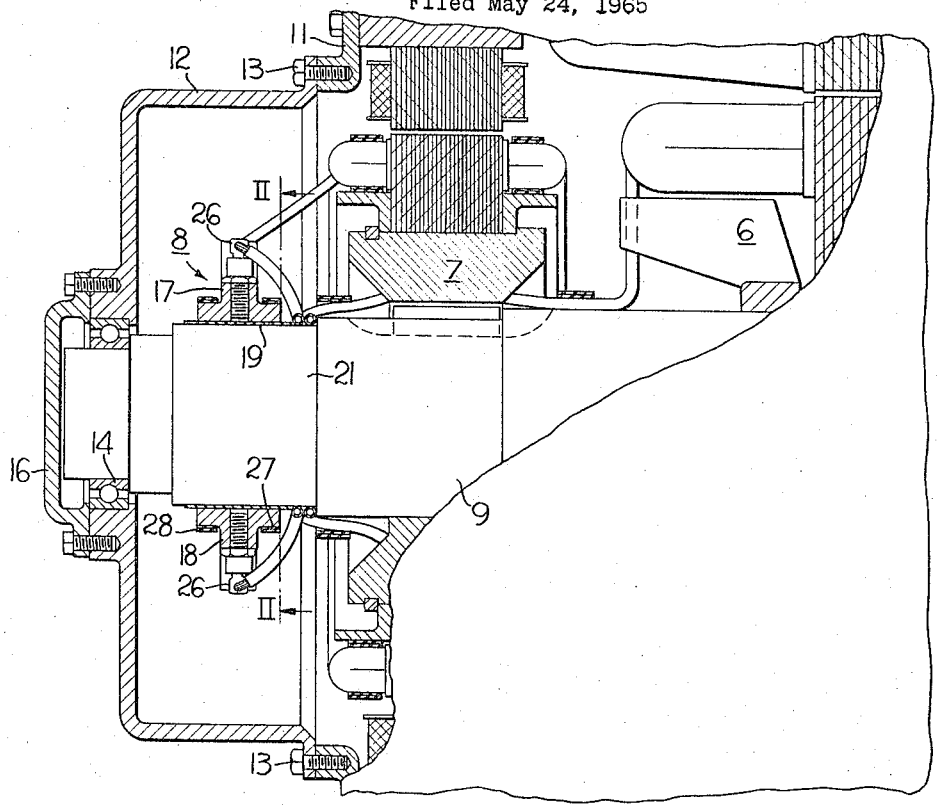
Figure 2:
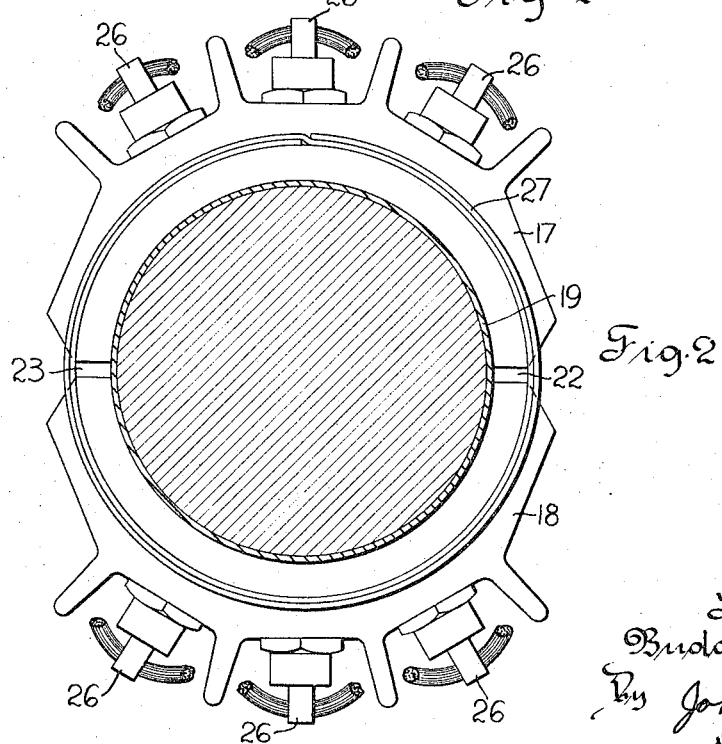

These and other objects of the subject invention will become more fully apparent as the following description is read in light of the attached drawing, wherein:

FIG. 1 is a partial side elevation, partly in section of a generator having a rectifier constructed in accordance with the subject invention; and FIG. 2 is a cross section taken along the lines II—II in FIG. 1.

Referring to the attached drawing, the electrical machine is made up of a generator 6, an exciter 7 and a rectifier 8. All three rotating elements of the machine are connected to a common shaft 9. A cylindrical casing 11 may be provided about the exciter and generator. An end cover 12 may be provided about the rectifier 8 and is therein shown as bolted to the end of the casing by means of circumferentially spaced cap screws 13. The shaft is rotatably supported in a conventional bearing 14 supported in the end cover 12 and covered by a bearing cover 16 connected to the end cover 12.

In accordance with my invention, the rectifier is made up of two half sections 17 and 18. One half section is an anode and the other a cathode. The two half sections of the rectifier are attached to the shaft 9 in any conventional manner so as to provide an insulated connection therebetween. In the preferred embodiment shown herein for purposes of illustration, an isotropic glass tape 19 is wound about a reduced portion 21, of the shaft 9. The isotropic glass provides electrical insulation between the shaft and the rectifier halves.

As shown in FIG. 2, the rectifier halves are constructed in a manner to define less than a complete circle when placed about the glass 19 on the reduced shaft portion 21. Because of this spaces 22 and 23 are provided between adjacent ends of the rectifier half sections. These spaces are of sufficient magnitude to effectively electrically insulate the rectifier halves from one another.

With continued reference to FIG. 2, the cross sectional configuration of the rectifier halves is an inverted T resulting in laterally extending shoulders at the base of each rectifier half. A polyester glass band tape 24 and 25 is wound completely about each shoulder, placed on top of this is a heat shrinkable tape 27 and 28 wound completely about each shoulder of both half sections to tightly hold the half sections in engagement with the glass tape 19 on the reduced shaft portion 21.

When the polyester glass band tape and the heat shrinkable tape has been wound on the rectifier half sections, the rectifying elements 26 are turned into threaded bores in the peripheral surface of the half sections. The proper electrical connections are then effected between the rectifying elements and the generator 6 and the exciter 7.

After all of the connections have been made, the whole assembly including the generator, the exciter and the rectifier is dipped in a varnish and baked. During the baking process the heat sensitive tape shrinks on the polyester glass band tape and provides an extremely rigid and permanent attachment between the rectifier halves and the reduced shaft portion. Furthermore because all the elements are attached to the shaft before the varnish is applied, a homogeneous mass is formed resulting in a unit construction of the generator, the exciter, and the rectifier.

From the above description it can be seen that an extremely simple inexpensive rectifier assembly has been developed. As mentioned previously in the past, it was the case to utilize two axially spaced disks as the anode and cathode of the rectifier elements. With the present invention, less axial space is required which is quite critical in many installations where axial length is a problem. Furthermore, in previous arrangements it was the usual case to shrink the rectifier sections onto the shaft after the assembly had been dipped in varnish and baked. With the present arrangement due to the assembly of the rectifier before the dipping and baking process, a much more integrated assembly results.

The embodiments of the invention in which an exclusive property or privilege is claimed are defined as follows:

1. In combination with a generator having a rotating shaft including a electrically insulated portion, a rotating rectifier constructed of two half sections positioned on said insulated portion of said shaft in a common plane transverse to the axis of said shaft, said half sections having an air gap between adjacent ends of sufficient magnitude to effectively insulate the half sections from one another, and a plurality of layers of polyester glass band tape upon which is placed a plurality of layers of heat shrinkable nonelectrically conductive tape connecting said half sections to said insulated shaft portion.

2. The combination set forth in claim 1 and further comprising a layer of varnish encasing all of the rotating elements of the combination.

(References on following page)

References Cited

UNITED STATES PATENTS

| | | | |
|---|---|---|---|
| 502,988 | 8/1893 | Parshall | 310—42 |
| 1,928,872 | 10/1932 | Sherwin | 310—42 |
| 2,497,141 | 2/1950 | Schultz | 310—68 |
| 2,832,907 | 4/1958 | McConnell | 310—68 |
| 2,972,711 | 2/1961 | Sorokin | 317—234 |
| 3,030,531 | 4/1962 | Lessmann | 310—68 |
| 3,034,035 | 5/1962 | Baumann | 322—28 |
| 3,227,941 | 1/1966 | Collamore | 310—68 |
| 3,145,314 | 8/1964 | Becker | 310—68 |

FOREIGN PATENTS 373,460   1/1964   Switzerland.

MILTON O. HIRSHFIELD, *Primary Examiner.*

J. D. MILLER, *Examiner.*